Sept. 17, 1935.   J. W. NICHOLLS   2,014,664
LIQUID MEASURING DEVICE
Filed Sept. 15, 1933

Inventor
John W. Nicholls
By Lyon & Lyon
Attorneys

Patented Sept. 17, 1935

2,014,664

UNITED STATES PATENT OFFICE 2,014,664

LIQUID MEASURING DEVICE

John W. Nicholls, Los Angeles, Calif., assignor to James E. Daugherty, Los Angeles, Calif.

Application September 15, 1933, Serial No. 689,572

4 Claims. (Cl. 73—30)

My invention relates to liquid measuring devices, and has particular reference to a device for measuring or metering liquid supplied from a source of supply to a consuming apparatus.

In transferring liquids from one point to another considerable difficulty is encountered in measuring or metering the quantity of liquid so transferred, particularly when the rate of flow of such liquid is relatively small. Such difficulty is particularly apparent when an attempt is made to measure or meter the quantity of liquid passed to a consuming device such as a liquid fuel burner, an internal combustion engine and the like, in which the quantity of fluid consumed per second is relatively small and in which the rate of consumption of the liquid varies between relatively wide limits within comparatively short spaces of time. Various devices have been suggested for the metering of liquids under such conditions which, in most instances, have consisted of apparatus which will at one time permit the flow of liquid from a reservoir or other source into a measuring chamber and then stop the inflow and permit the filled chamber to be drained, and then to repeat this alternate inlet and outlet of the liquid measuring, counting the number of chambers full of liquid which have been passed through the metering apparatus.

However, such devices do not adapt themselves readily to liquid consuming devices which require the maintenance of a fluid head on the liquid or in which the liquid must be fed to the consuming apparatus under pressure, since the alternate filling and emptying of the chamber necessarily requires that any pressure applied to the liquid from the source will be disbursed at the metering device.

It is, therefore, an object of my invention to provide a liquid metering device which will measure liquids at a minute rate of flow.

Another object of my invention is to provide a liquid metering device which will permit the application of pressure to the liquid entering the metering device and transmit such pressure to the liquid, leaving the metering device, maintaining a pressure head on the liquid to the point of its entrance into the consuming or receiving device.

Another object of my invention is to provide a liquid metering device which will measure the quantities of liquid supplied to a consuming device and in which pressure applied to the liquid between the source of supply and the metering device will be transmitted through the metering device.

Figure 1:
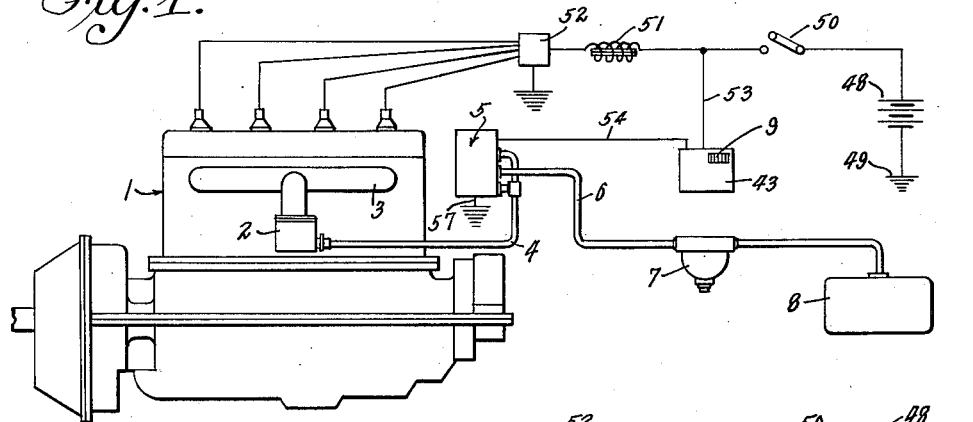
Figure 2:
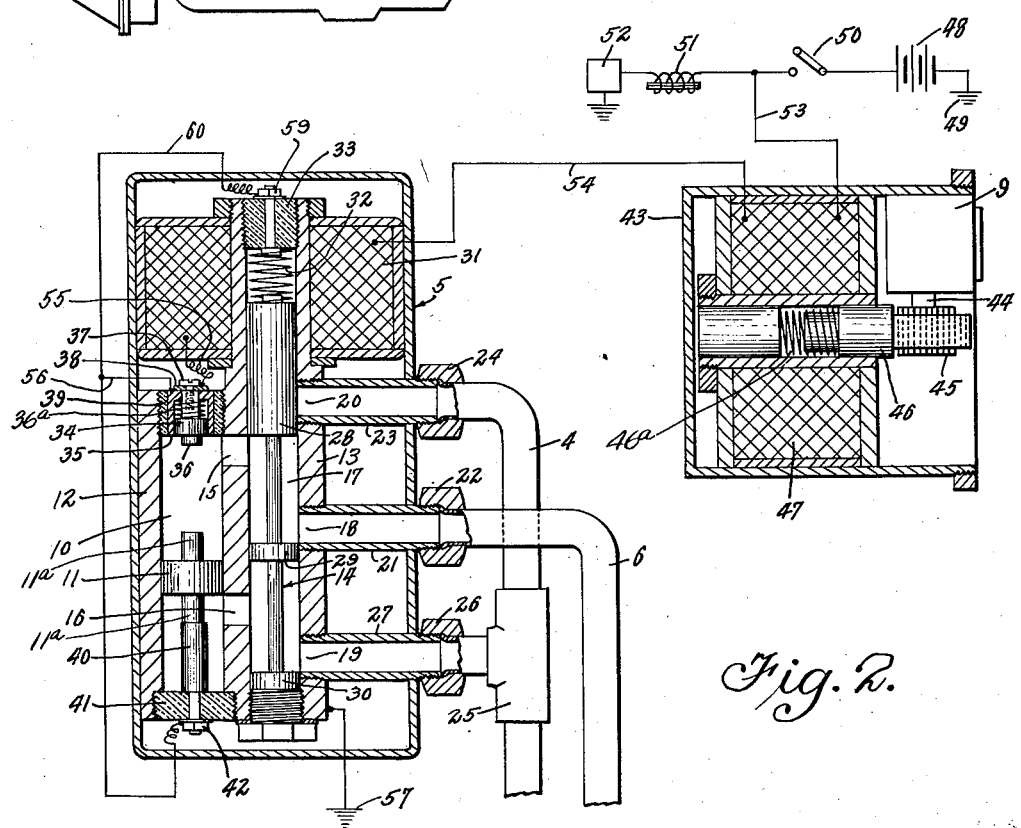

Other objects and advantages will be apparent from a study of the following specifications read in connection with the accompanying drawing, wherein Figure 1 is a diagrammatic view illustrating the adaptation of my invention to measure fuel supplied to an internal combustion engine; and Figure 2 is a detail, sectional view through a liquid meter constructed in accordance with my invention.

Referring to the drawing, I have illustrated in Figure 1 an internal combustion engine 1 to which fuel is supplied through a suitable carbureter 2 connected to the intake manifold 3 of the engine. Fuel is supplied to the bowl of the carbureter 2 through a suitable supply pipe 4 connected directly to a fuel metering device 5. Fuel to the metering device may be supplied through an inlet pipe 6 connected to receive fuel under pressure from a suitable pump 7, such as is ordinarily found in motor vehicle constructions. The pump 7 is illustrated as being interposed in the fuel line 6 between the tank 8, or other reservoir containing a suitable supply of the fuel, though it will be understood that my liquid metering device may be interposed in any liquid feed line extending from any suitable source to any liquid consuming or receiving apparatus.

In the construction shown in Figure 1, it will be apparent that fuel which is passed from the tank 8 to the carbureter 2 will be required to pass through my fuel metering device and will be measured therein so that at all times an indication of the amount of fuel which has been consumed may be registered.

In my copending application, Serial No. 671,027, filed May 15, 1933, I have illustrated one form of fuel metering device particularly adapted to an internal combustion engine or motor vehicle application in which the fuel supplied to the engine is passed through a fuel measuring device connected to a counter or register which will register the quantities of fuel so supplied.

In the present form of the invention, I have illustrated a similar register 9 which may be mounted in any suitable location, preferably upon the dashboard of the vehicle, which may be connected to suitable electric circuits to the fuel metering device 5 so that each operation of the fuel metering device will be registered upon the counter.

By referring particularly to Figure 2, it will be observed that the fuel metering device 5 consists essentially in a measuring chamber or cylinder 10 in which reciprocates a freely floating piston 11. The cylinder 10 may be formed in a suitable frame or casting 12, which also constitutes or includes a valve housing 13 in which a piston valve 14 is reciprocably mounted.

The measuring cylinder or chamber 10 is provided with a pair of ports 15 and 16 which communicate directly with the valve cylinder 17, the ports 15 and 16 being preferably located one at each end of the measuring cylinder 10.

The valve cylinder 17 is provided with an inlet port 18 communicating therewith near the center of the valve cylinder, while a pair of outlet ports 19 and 20 are provided in the valve housing 13 communicating with the valve cylinder preferably on near each end of the valve cylinder.

The inlet port 18 is illustrated as being connected through a suitable nipple 21 to the inlet or feed pipe 6 by means of any suitable connection, such as a union 22. In like manner the outlet port 20 may be connected through a nipple 23 and union 24 to the supply pipe 4 which pipe is also connected through a suitable T-joint 25 and union 26 to a nipple 27 which, in turn, is connected to the outlet port 19.

With the apparatus thus far described, it will be apparent that fuel which flows through the feed pipe 6 will enter the valve cylinder 17 through the port 18 and will pass to the measuring cylinder 10 either through the measuring cylinder port 15 or the port 16, depending upon the position of the valve 14. The piston valve 14 is illustrated as having its body closely fitted in the valve cylinder, while portions thereof are cut away or reduced in diameter to provide liquid passages and to provide upon the valve 14 three valve pistons 28, 29 and 30 so disposed along the length of the valve cylinder 17 that when the piston valve is in its lowermost position, as illustrated in Figure 2, a passage between the outlet port 19 and the port 16 for the measuring cylinder is open, while a passage between the port 15 of the measuring cylinder and the inlet port 18 is open. With the piston valve in its uppermost position the pistons 28, 29 and 30 will each be above their respective ports 20, 18 and 19 and will provide an open passage between the outlet port 20 and the port 15 in the measuring cylinder, while, at the same time, an open passage is provided between the port 16 of the measuring cylinder and the inlet port 18. The piston valve is arranged, preferably, to be moved by gravity to its lowermost position, as illustrated in Figure 2, while it may be moved to its uppermost position by energization of a coil 31 constituting the coil of a solenoid in which the upper end of the piston valve constitutes a movable core. To insure rapid movement of the piston valve upon de-energization of the coil 31, I prefer to provide a spring 32 interposed between a plug 33, closing the uppermost end of the valve cylinder 17, and the upper end of the piston valve 14.

To automatically control the energization and de-energization of the coil 31, I provide a pair of contact devices in the measuring cylinder. One of these contacting devices is illustrated at 34 at the upper end of the measuring cylinder 10. In the form of the device illustrated herein, this contact member 34 is illustrated as being of the normally closed contact type comprising a suitable sleeve 35 of metal, within which is slidably mounted a contact carrier 36 preferably formed of insulating material.

The upper end of the contact carrier 36 is provided with a screw 37 which is employed to attach a metal washer 38 thereto so that when the contact carrier 36 is in its lowermost position to which it may be urged by a small spring 36a the metal washer 38 is in electrical contact with the sleeve 35. But when the contact carrier 36 is moved upwardly by the piston 11 the washer 38 will be moved upwardly away from electrical contact with the sleeve 35, thus opening the circuit as hereinafter described. The sleeve 35 is illustrated as being mounted within a suitable bushing of insulating material 39 to insulate the contact assembly from the metal parts of the metering device.

The other contact device is illustrated at 40 and may comprise a suitable insulating plug 41 closing off the lower end of the measuring cylinder 10. A metallic electrode 42 is illustrated as being mounted upon the plug 41 so as to be insulated from the remaining metal parts of the metering device, so that when the piston 11 is in its lowermost position it will complete an electrical contact extending between the insulated electrode 42 and the metal parts of the metering device to effectively ground the electrode 42, while when the piston 11 is moved away from its lowermost position such grounding contact is broken.

The contact between the piston 11 and the contact members 36 and 40 are preferably made through the agency of projecting metallic abutments 11a formed upon the piston 11 and extending on opposite sides thereof. The abutments are preferably of such length as to engage the contact members to stop movement of the piston before it has an opportunity to close off either of the ports 15 or 16.

The counter 9 is illustrated as being contained within a suitable housing 43 which may be mounted, as hereinbefore stated, upon the dash or other suitable portion of the vehicle upon which my metering system may be mounted. The counter may be of any of the well-known types of counters familiar to those skilled in the art, having an operating shaft 44 which, when oscillated, will operate the counter to count the oscillations. I prefer to connect the shaft 44 of the counter to the core 46 of a solenoid or electromagnetic coil 47 as by means of gear and rack connection 45 so that upon each energization of the coil 47 the counter will be operated to move the next number into view in the sight opening of the counter, while upon de-energization of the coil 47 a spring 46a will return the core 46 to its extended position as shown in Fig. 2.

Preferably electric current from any suitable source is connected to supply the solenoid 47 and the coil 31 in series relation so that energization of one of these coils is accompanied by energization of the other coils.

In the form of the device illustrated herein, such electric source of supply is illustrated as including the usual ignition and lighting battery 48 employed upon automobiles, one pole of which is grounded at 49 while the other pole is connected through the usual ignition switch 50 to supply current to the ignition coil 51 and distributor 52, and thus supply current to the spark plugs of the internal combustion engine, 1.

Interposed between the ignition switch 50 and the spark coil 51 may be connected a conductor 53 which extends to one terminal of the solenoid 47 while a similar conductor 54 may extend from the other terminal of the solenoid 47 to one terminal of the coil 31. I prefer to connect the opposite terminal of the coil 31 to the metallic washer 38 on the contact member 34 by means of a suitable conductor 55. The sleeve 35 of the contact member 34 may be connected through a conductor 56 to the insulated electrode 42 so that whenever the piston 11 is in its lowermost position a complete circuit extending from the battery 48 through the coils 47 and 31, the contacts 38 and 35 of the contact member 34 and through the insulated electrode 42 and the piston 11 to the metallic parts of the measuring device, which are illustrated as being grounded at 57.

Since the piston 11 will assume its lowermost position whenever fluid contained within the cylinder 10 below the piston has been drained out through the ports 16 and 19, it follows that upon the closure of the ignition switch 50 the coils 47 and 31 will be immediately energized, thus raising the piston valve 14 to its uppermost position. Thus fluid will flow from the source or tank 8 through the feed pipe 6 and through the port 16 to the underneath side of the piston 11. Since the piston 11 is free in the cylinder 10 the pressure of the fluid entering the port 16 will cause the piston 11 to rise in the cylinder. This would break contact between the electrode 42 and the piston 11, and I therefore prefer to provide a suitable holding circuit for maintaining the coil 31 energized, which may be readily accomplished by mounting an electrode 59 in an insulating plug 33 which closes the upper end of the valve cylinder, and connecting this electrode through a suitable conductor 60 so that whenever the valve piston is elevated to its uppermost position it will contact the electrode 59 effectively grounding the conductor 56 independent of the electrode 42 and the piston 11. This fluid will continue to flow through the port 16 until the piston 11 rises to its uppermost position, at which time it will engage and lift the contact carrier 36 and break the circuit which has, up to this time, been established through the coil 31.

It will be apparent to those skilled in the art that when the coil 31 was energized the solenoid 47 was also energized to move the counter one position. The counter 9 may be of any suitable character, provided that one operation of its shaft 44, as by the energization of the solenoid 47, will cause it to register one number in the sight opening of the instrument, while the next energization of the coil 47 will cause the next consecutive number to be registered in the sight opening.

The diameter and length of the cylinder 10 may be selected of any suitable values, such that when the piston 11 has traveled from its lowermost position to its uppermost position a predetermined volume of fluid has been admitted into the cylinder 10. For example, the cylinder may be so constructed that that fluid necessary to raise the piston 11 to its uppermost position is one-thousandth of a gallon. Thus each upward operation of the piston represents one-thousandth of a gallon of fluid passed into the meter.

When the piston 11 has, upon its arrival at the uppermost position in the cylinder 10, opened the contacts 38 and 35 and thus de-energized the coil 31, the valve piston 14 will descend to the position shown in Figure 2, thus preventing further ingress of fluid from the source to the underneath side of the piston but permitting fluid from the source to now pass through the inlet 18 to the port 15 and to the upper side of the cylinder. This will drive the piston 11 down in its cylinder to force the fluid beneath it and out through the port 16 to the supply pipe 4. This downward movement will continue until the piston arrives in its lowermost position, during which time a volume of liquid has been passed into the cylinder 10 above the piston 11 equal to the amount of fluid which has been moved out of the cylinder below the piston.

When the piston 11 arrives at its lowermost position and again contacts the electrode 42, the energizing circuit for the coils 47 and 31 is reestablished and the operation is repeated.

It will be apparent, therefore, that any pressure which is applied to the liquid in the pipe 6 will be transmitted as force or pressure exerted upon the piston 11, either to move the piston up or to move the piston down, and such pressure will also be transmitted through the piston to the outgoing liquid so that the same, or substantially the same, pressure is maintained in the fuel metering device 5 as is applied to the fluid in the feed pipe 6.

While I have shown and described the preferred embodiment of my invention, it is to be understood that I do not wish to be limited to any of the details of construction shown herein, except as defined in the appended claims.

I claim:

1. In a liquid metering device, means defining a liquid measuring chamber having a pair of ports one communicating therewith near each end of said chamber, a piston in said chamber movable longitudinally thereof by ingress of liquid through one of said ports to force liquid from the other of said ports, a valve movable from one position directing liquid into one of said ports to a second position for directing liquid into the other of said ports, electromagnetic means for moving said valve from one of its positions to the other of its positions, means for moving said valve from said other position to said one position, electric switch means actuated by said piston when it arrives at one end of said chamber for energizing said electromagnetic means and operable by the said piston when it arrives at the other end of said chamber for de-energizing said electromagnetic means.

2. In a liquid metering device, means defining a liquid measuring chamber having a pair of ports one communicating therewith near each end of said chamber, a piston in said chamber movable longitudinally thereof by ingress of liquid through one of said ports to force liquid from the other of said ports, a valve movable from one position directing liquid into one of said ports to a second position for directing liquid into the other of said ports, electromagnetic means for moving said valve from one of its positions to the other of its positions, means for moving said valve from said other position to said one position, electric switch means actuated by said piston when it arrives at one end of said chamber for energizing said electromagnetic means and operable by said piston when it arrives at the other end of said chamber for de-energizing said electromagnetic means, an electrically operated registering means operably responsive to the energization of said electromagnetic means for counting the operations of said valve.

3. In a liquid metering device, means defining a liquid measuring chamber having a pair of ports one communicating therewith near each end of said chamber, a piston in said chamber movable longitudinally thereof by ingress of liquid through one of said ports to force liquid from the other of said ports, a valve movable from one position directing liquid into one of said ports and a second position for directing liquid into the other of said ports, electromagnetic means for moving said valve from one of its positions to the other of its positions, means for moving said valve from said other position to said one position, a pair of electrical contact means, one near each end of said chamber and engageable by said piston when said piston arrives at the end of its cylinder, an electrical circuit for said electromagnetic means actuated by engagement of said piston with one of said contact means for energizing said electromagnetic means and operable by engagement of said piston with the other of said contact means for de-energizing said electromagnetic means.

4. In a liquid metering device, means defining a liquid measuring chamber having a pair of ports one communicating therewith near each end of said chamber, a piston in said chamber movable longitudinally thereof by ingress of liquid through one of said ports to force liquid from the other of said ports, a valve movable from one position directing liquid into one of said ports and a second position for directing liquid into the other of said ports, electromagnetic means for moving said valve from one of its positions to the other of its positions, means for moving said valve from said other position to said one position, a pair of electrical contact means, one near each end of said chamber and engageable by said piston when said piston arrives at the end of its cylinder, an electrical circuit for said electromagnetic means actuated by engagement of said piston with one of said contact means for energizing said electromagnetic means and operable by engagement of said piston with the other of said contact means for de-energizing said electromagnetic means, and counting means operable by energization of said electromagnetic means for counting the number of operations of said piston.

JOHN W. NICHOLLS.